(No Model.) 2 Sheets—Sheet 2.
C. PRATTEN.
PRESS FOR MOLDING PLASTIC MATERIALS.
No. 544,687. Patented Aug. 20, 1895.
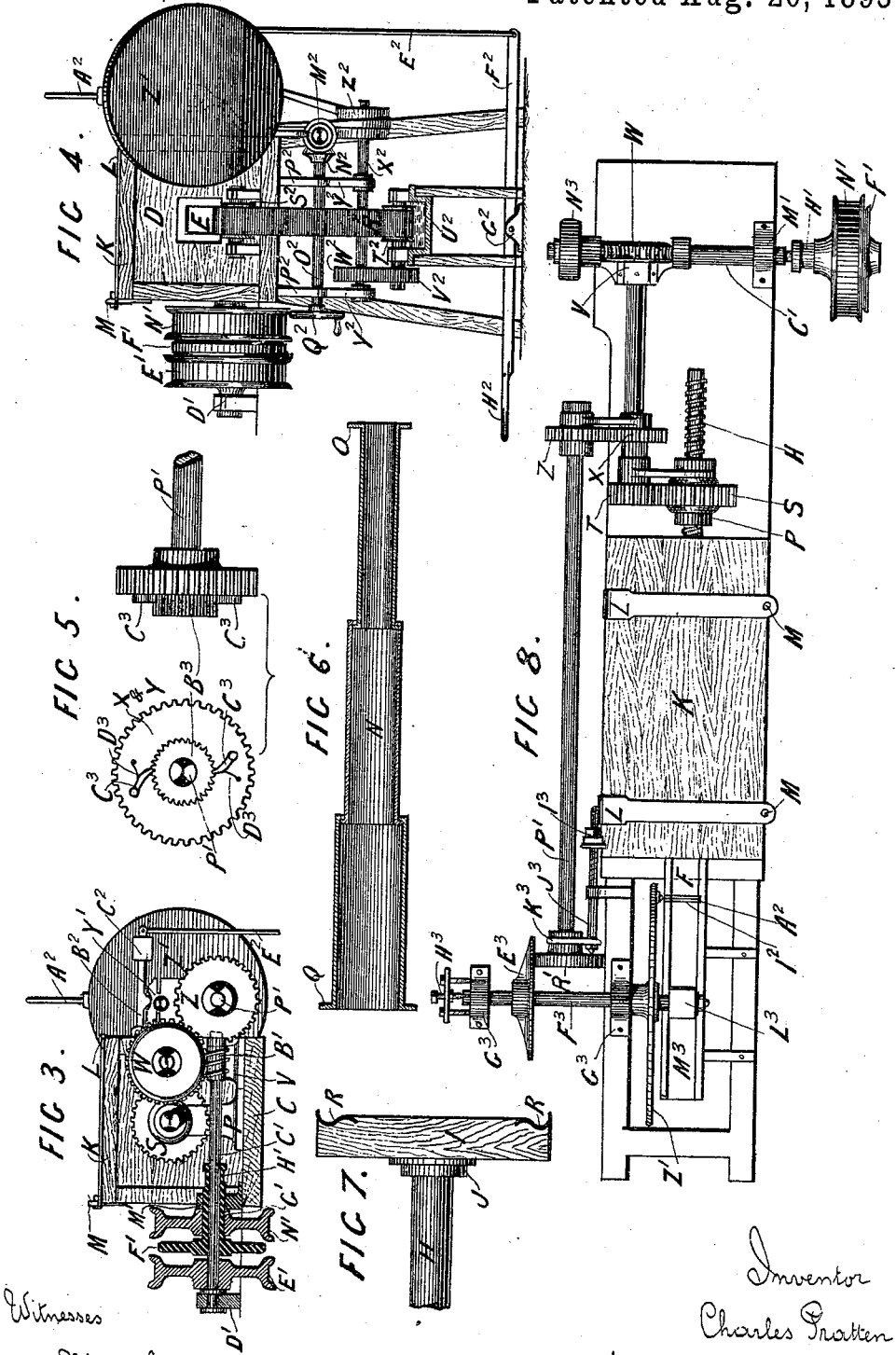
Witnesses
H. van Dedemmeel
E. A. Scott
Inventor
Charles Pratten

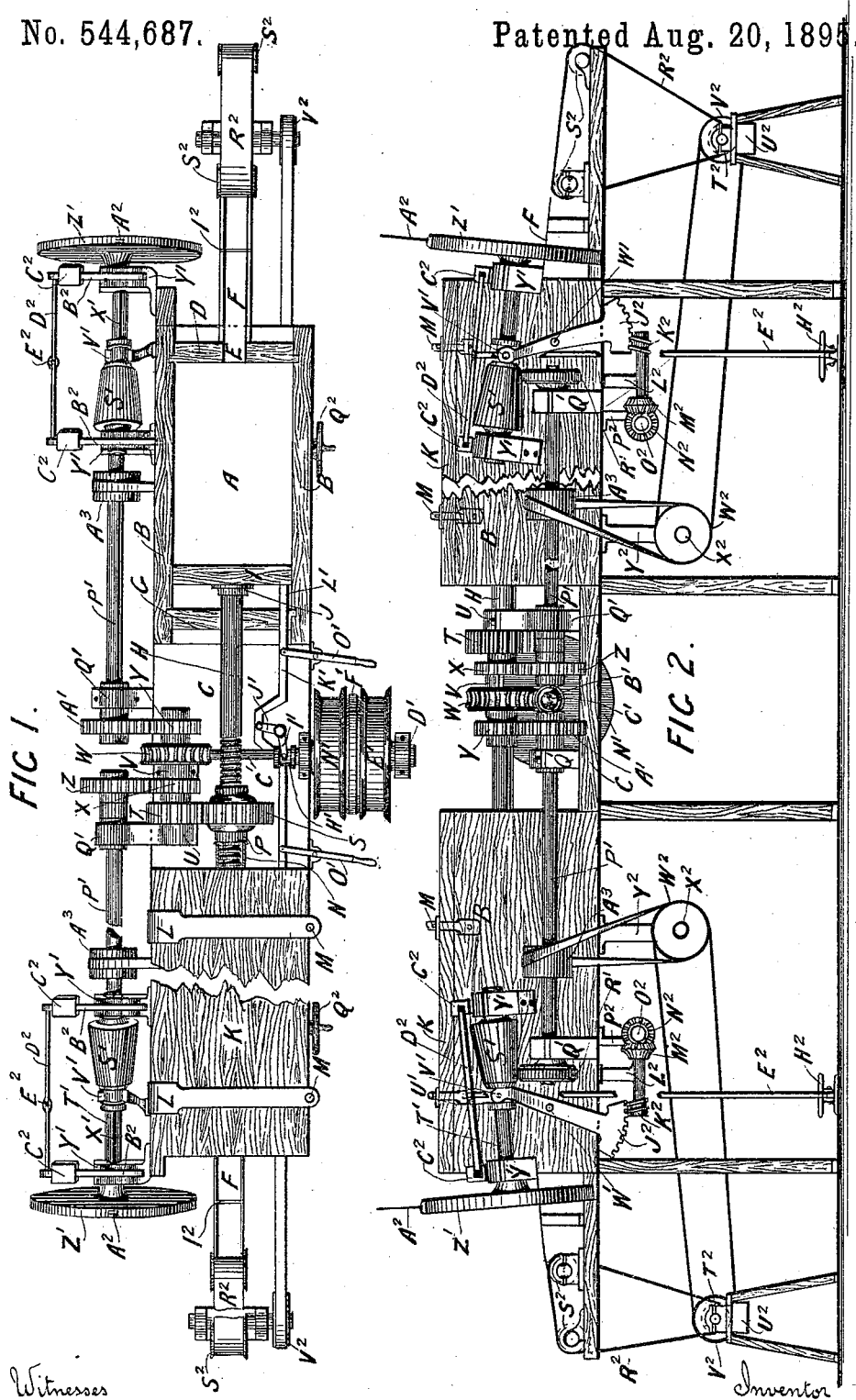

UNITED STATES PATENT OFFICE.

CHARLES PRATTEN, OF SYDNEY, NEW SOUTH WALES.

PRESS FOR MOLDING PLASTIC MATERIALS.

SPECIFICATION forming part of Letters Patent No. 544,687, dated August 20, 1895.

Application filed April 19, 1895. Serial No. 546,362. (No model.)

*To all whom it may concern:*

Be it known that I, CHARLES PRATTEN, company manager, a subject of the Queen of Great Britain, residing at Harris Street, Sydney, in the Colony of New South Wales, have invented a new and useful invention for Improvements in Presses Suitable for Molding Plastic Materials and Subsequently Dividing the Same into Blocks; and I do hereby declare that the following is a full, clear, and exact description of the invention, which will enable others skilled in the art to which it appertains to make and use the same.

My invention consists in the novel features hereinafter described, and pointed out particularly in the claims.

My invention is illustrated by the accompanying drawings, in which the same letters are used in the different views to indicate similar parts, and in which—

Figure 1 is a part plan and part sectional plan of a double-chambered press provided with my special driving-gear, automatic reversing-gear, cutting-off mechanism, and delivery-band. Fig. 2 is a side elevation of Fig. 1, showing the various gearing used for driving, cutting off, and delivering. Fig. 3 is a section and part elevation of Figs. 1 and 2, showing driving-pulleys, double-faced friction-clutch, worm, and screw-gearing. Fig. 4 is an end view of Figs. 1 and 2, looking toward outlet-orifice. Fig. 5 shows two views of the external pawl and ratchet combined with spur-wheel. Fig. 6 is a detail of the telescopic tube or casing for covering operating-screw. Fig. 7 is a detail of ram-head, showing cup-shaped packing inserted therein. Fig. 8 is a plan of a single-chamber press with cutting-off mechanism placed at right angles to operating-shaft.

The chambers A A are the receptacles for the plastic material having the sides B suitably held together, the table portion C serving to support the driving-gear. The outlet ends D are pierced with the orifice E, from which the expressed material passes onto the guide-table F. Through the back end G the operating rod and screw H pass and are attached to the ram-heads I by means of the plate J. The movable covers K are provided with the hinges L, which are secured with key-bolts M. At the screw end of H, where the lubricant is used, is placed the telescopic tube or casing N, which is so constructed that the movement of the screw will cause the parts to slide within each other, the flange O being secured to the standard P, which is attached to C. The flange Q is likewise secured to the back side of the ram-head I. This telescopic tube or casing acts as a receiver of the lubricant, which may drop from the operating-screw spindle H. The cup-shaped asbestos or whalebone packing R is inserted in the face of I, as shown in Fig. 7, and during the advancing movement of I will, by reason of the pressure of the plastic material within the chamber, cause a close joint to be formed, which will have the effect of preventing any of the material passing behind the piston.

The actuating-nut for the screw portion of H is placed in the boss of the spur-wheel S, which is held in position by the standards P. S receives its motion from the pinion T, attached to a spindle running in the bearings U and V. Upon the same spindle is keyed the worm-wheel W and the spur-wheel X. Upon the outer end is a spur-wheel Y, similar to X, but instead of being keyed is provided with a ratchet and pawls, both X and Y gearing with Z and A', respectively, the former being a ratchet-wheel and the latter keyed.

The worm-wheel W is driven by the worm B', attached to the driving-spindle C', running in the bearings V and D'. Upon C' is placed the other loose pulley E' and the double-faced friction-clutch F', which is provided with a sleeve G', having a clutch-bearing H' for the clutch-lever I', which is also attached to the operating-lever J', which in its turn is secured to the impulse-rod K', the ends of the said rod passing through the back ends G, so that it may be operated during the receding movement of I by coming in contact with the ends L'. The bearing M' serves to support the sleeve G', and also acts as a stop to the loose pulley N' when the friction-clutch F' is being operated.

To the impulse-rod K' is attached the levers O', which may be operated by the attendant when it is desired to change the motion or stop the machine.

If the friction-clutch F' is operated by means of I', so as to press against E', the press will be made to operate in one direction; but if it is brought in contact with the pulley N' it will operate in the reverse direction. This change of motion is accomplished by using a straight driving-belt for one pulley and a crossed driving-belt for the other pulley.

The counter-shafts P' for operating the cutting-off mechanism are supported in the bearings Q'.

The wheels Z and A' before mentioned are placed on the inner ends, as shown, so as to gear with X and Y. On the other ends are secured the friction-pulleys R', which drive the taper friction-cones S' on the spindle T', the said cones being provided with clutch-journals U' for the fork ends of the clutch-levers V', the said levers being pivoted to the side of the chambers with the pins W'. The aforesaid spindles T' are provided with feathers X' for the cones S' to slide upon. T' is supported in the hinged bearings $y'$.

On the extreme ends of X' are the face-plates Z' in the periphery, on which are secured, by means of the ordinary bolt or nut, the knives or cutters $A^2$. More than one such knife or cutter may, if it be thought desirable, be attached to these face-plates, and the position of the knives or cutters may be changed by taking them out of one part of the face-plate and inserting them in any other desired part.

The bearings Y' are kept in position by means of the hinged levers $B^2$, having on their outer ends the weights $C^2$. $B^2$ are held together by means of the tie-rods $D^2$, to which are attached the connecting-rods $E^2$, which in turn are attached to the treadles $F^2$, which are poised in the bearing-plates $G^2$. One end of $F^2$ is supplied with foot-plates $H^2$.

The guide-tables F, before mentioned, are provided with slits or apertures $I^2$ for the passage of $A^2$ during the cutting operation.

The aforesaid clutch-levers for operating S' are provided with toothed quadrants $J^2$, which are operated by the worms $K^2$ attached to spindles running in the bearings $L^2$, secured to the under side of the chambers.

The spindle carrying $K^2$ has upon the opposite end the beveled pinion $M^2$, gearing with a similar bevel-pinion $N^2$ attached to the spindles $O^2$, which are supported with bearings $P^2$. Upon the extreme end of $O^2$ and convenient to the attendant are the hand-wheels $Q^2$.

The traveling bands $R^2$ for removing the expressed material are kept in tension by the top flanged rollers $S^2$, supported in the usual way with bearings, and the bottom rollers $T^2$ running in the trough $U^2$, which for some purposes would be filled with water.

The spindles carrying $T^2$ are provided with the pulleys $V^2$, and are driven by the pulleys $W^2$ upon the spindles $X^2$, supported in the bearings $Y^2$. On the other end of $X^2$ are the pulleys $Z^2$, which are driven by the pulleys $A^3$ attached to P'.

In Fig. 5 the external pawl and ratchet is shown, which is the class of gearing employed both for Y and Z.

P' is the counter-shaft. $B^3$ is the ratchet keyed to P'. $C^3$ are the external pawls. $D^3$ are the springs for $C^3$.

In Fig. 8 the cutting-off mechanism is shown at right angles to P', the friction face-plate $E^3$ being attached to the spindle $F^3$, and is driven by R'. $F^3$ is supported in the bearings $G^3$, the outer one being provided with the adjustable set-screw $H^3$, which is used for setting $E^3$ up against R'. The inner end of $F^3$ carries the face-plate Z', provided with the knife or cutter $A^2$, for the passage of which the slit $I^2$ is provided. The position of R' may be changed by operating the adjustable nut $I^3$, which will have the effect of drawing the rod $J^3$ in the desired direction, $J^3$ being secured to the clip $K^3$, which clasps the boss of R'. $F^3$ may be prolonged in the manner shown, and the circular printing-pad $L^3$ placed thereon. $M^3$ is the delivering-trough. The pulley $N^3$ is for the return motion which has to be imparted to this form of machine. The driving-pulley N' is the only pulley required, and the friction-plate F' is single faced and not double, as used in Figs. 1 to 4, inclusive.

The presses constructed in accordance with my invention if applied in the manner proposed would necessarily vary in the constructional details. The essential modifications would be restricted according to the special use to which the press or presses are to be put. For instance, if clay were the plastic material to be operated upon and a pipe were required to be made, while the same form of cutting mechanism would be used the form of the chamber and its outlet-orifice would necessarily be adaptable to the formation of pipes. If plastic bricks were to be made another form of outlet-orifice would be required. In the latter case the traveling band would be serviceable for the delivery of the bricks, but in the case of the pipes such band might, perhaps, be dispensed with.

When using my press for expressing butter, the traveling band and cutting-off mechanism may be used in the manner shown, and it would be preferable to have such band running through a trough of water, which would prevent the expressed material clinging to the band.

I do not therefore confine myself to the exact form of chamber shown in the drawings as being applicable to all the kinds of plastic material referred to in this specification; but What I consider as novel and therefore desire to claim is—

1. In combination, the chambers, the pressure pistons therein, the screw connecting the pistons, the driving mechanism therefor including the shaft C', the worm wheel W, the shaft U carrying the same and the gears T and S, the shafts P' extending to the discharge ends of the two chambers, the cutters thereon and the pawl and ratchet connections between the shaft U and the shafts P' arranged to operate the same alternately, substantially as described.

2. In combination the two chambers, the two pistons, the screw connecting the pistons, the shaft C', the connections therefrom for operating the screw, the cutters, the shafts carrying the same, the reversely arranged clutch connections between the shaft C' and the cutter shafts, and reversing mechanism for the shaft C' including the reversing clutch and the impulse rod for operating the same arranged to be operated by the plungers, substantially as described.

3. In combination, the chambers, the presser pistons, the cutters, driving mechanism for the pistons and driving mechanism for the cutters comprising the shaft T', the cone adjustable thereon, the shaft P', the friction disk on the same engaging the cone, means for shifting the cone, the adjustable bearings for the shaft T' for pressing thereon, the tie rods D² and the treadle and rod E² connected thereto, substantially as described.

4. In combination, the chambers, the presser pistons therein, the screw with mechanism for operating the same including a clutch and an impulse rod for reversing the same, said rod being operated by the presser pistons, the cutters, the cutter shafts P' carrying the same, the alternately acting clutch mechanism for operating the shafts P' with the cutters, and the delivery bands with operating connections thereto, said connections being operated from the shafts P' whereby said delivery mechanism will act with the cutters or remain inactive therewith, substantially as described.

In witness whereof I have hereunto set my hand in presence of two witnesses.

CHARLES PRATTEN.

Witnesses:
JOHN J. STONE,
HARRY A. SMEDLEY.